United States Patent [19]

Fitchett

[11] 4,186,553

[45] Feb. 5, 1980

[54] CABLE PROTECTION EQUIPMENT

[75] Inventor: Kevin Fitchett, Aston-on-Trent, England

[73] Assignee: Coal Industry (Patents) Limited, England

[21] Appl. No.: 903,874

[22] Filed: May 8, 1978

[30] Foreign Application Priority Data

May 10, 1977 [GB] United Kingdom ............... 19553/77

[51] Int. Cl.$^2$ .............................................. F16L 3/14
[52] U.S. Cl. ........................................ 59/78.1; 248/49
[58] Field of Search ..................... 59/78.1; 248/49, 51, 248/68 R

[56] References Cited

U.S. PATENT DOCUMENTS

| | | | |
|---|---|---|---|
| 3,197,954 | 8/1965 | Merker | 59/78.1 |
| 3,284,036 | 11/1966 | Nansel | 248/49 |
| 3,772,875 | 11/1973 | Viano | 59/78.1 |
| 3,779,003 | 12/1973 | Boissevain | 59/78.1 |
| 3,921,388 | 11/1975 | Loos | 59/78.1 |
| 4,018,411 | 4/1977 | Henning | 59/78.1 |

FOREIGN PATENT DOCUMENTS

| | | |
|---|---|---|
| 762546 | 11/1956 | United Kingdom. |
| 1077029 | 7/1967 | United Kingdom. |
| 1249018 | 10/1971 | United Kingdom. |
| 1400109 | 7/1975 | United Kingdom. |

*Primary Examiner*—Francis S. Husar
*Assistant Examiner*—Gene P. Crosby
*Attorney, Agent, or Firm*—Stevens, Davis, Miller & Mosher

[57] ABSTRACT

A chain for protecting electric and/or hydraulic supply cables to a mining machine repeatedly traversing to and fro. The links each comprising two elements which when connected define a passageway for the supply cables and which can be at least partially disconnected to permit access to the passageway, both the elements being pivotally attached to the elements of neighboring links.

10 Claims, 16 Drawing Figures

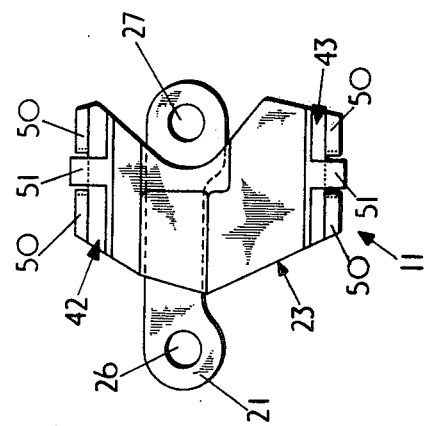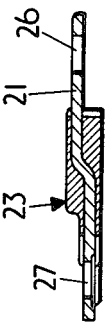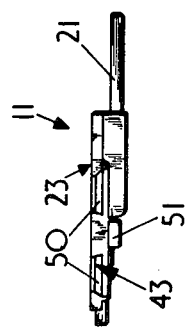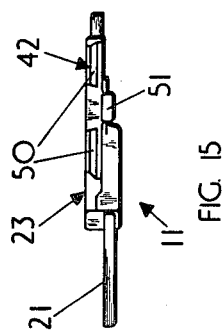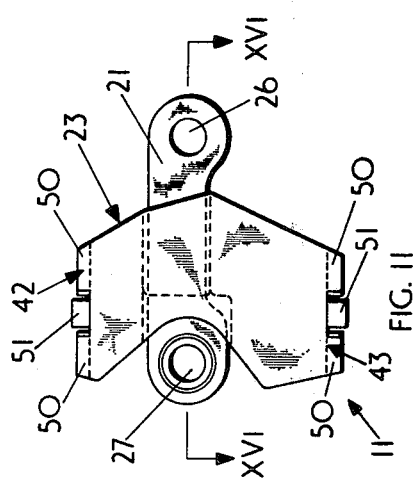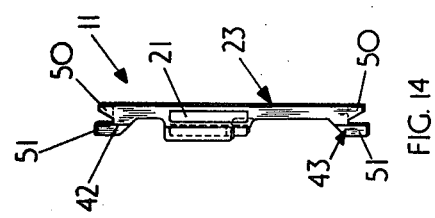

CABLE PROTECTION EQUIPMENT

This invention relates to chain links for protecting elongate flexible supply components leading to equipment which, in use, repeatedly traverses to and fro.

In particular, although not exclusively, the invention relates to a chain link for protecting an electric cable and/or hydraulic hose to a mineral mining machine which in operation repeatedly traverses to and fro along a longwall face winning mineral from the working face.

It is known for chain links used in underground mining to comprise open sided box-shaped elements which define an open sided passageway for the electric cable and/or hydraulic hose and which are pivotally attached to adjacent links, the electric cable and/or hydraulic hose being retained in the open sided passageway by retainer elements located across the open side of the box-shaped element.

Unfortunately, the single pivotal attachment between two adjacent links permitted the links to twist relative to one another in a direction about the longitudinal axis of the chain. This twisting of the links tended to damage the links and frequently the chain broke. When this occurred not only did the chain have to be replaced but in addition the electric cable and/or hydraulic hose within the passageway were frequently damaged due to the chain breaking and they too had to be replaced.

Such an event was costly because not only had the chain, cable and hose to be replaced, but also the repair was a time consuming operation during which no mineral was won from the face.

An object of the present invention is to provide an improved chain link which tends to overcome or reduce the above mentioned disadvantage.

According to the present invention a link adapted to be pivotally attached to adjacent links which in use provide a chain for protecting at least one elongate flexible supply component leading to equipment which in use repeatedly traverses to and fro, the link comprising two elements which when connected define a passageway for said at least one elongate supply component and which can be at least partially disconnected to permit access to the passageway, both the elements being capable of being pivotally attached to elements of adjacent links.

Preferably, one of the elements defines an open sided passageway with the other element defining a side closure member for the passageway.

Advantageously, the said one element defines a slideway extending in a direction along the passageway, the said other element being engageable with and slideable along the slideway to close the otherwise open sided passageway.

Conveniently, the closure member is retained in the closed position when the link is pivotally attached to adjacent links.

Conveniently, the said one element has vertical end margins providing slide surfaces adapted, in use, to slideably engage and support vertical end margins on other links of the chain when the chain is looped back over itself as the equipment repeatedly traverses to and fro.

The present invention also provides a chain comprising a plurality of links as defined above, the said one elements of each link being pivotally attached to said one elements of adjacent links and said closure members of each link being pivotally attached to the closure members of adjacent links.

Preferably, a plurality of attached closure members are simultaneously engageable with, and slideable along, the slideways of the respective said one elements.

Preferably, the elements are detachably pivotally attached to the elements of adjacent links by pins engageable in cross holes formed in the elements.

Preferably, the elements of preselected links are releasably pivotally attached by locking pins which extend across the passageway interconnecting the said one element with its associated closure members which thereby is retained in the closed position.

Preferably, the elements have cut-outs to accommodate the vertical end margins of adjacent links when the chain is looped over.

By way of example only, one embodiment of the present invention will now be described with reference to the accompanying drawings, in which:

FIG. 11 is a side view of other element of the chain link of the chain equipment of FIGS. 1 to 4;

FIG. 12 is an inverted plan of the element of FIG. 11;

FIG. 13 is a side view of the element of FIG. 11, viewed from the opposite side to FIG. 11;

FIG. 14 is an end view of the element of FIG. 11;

FIG. 15 is a plan of the element of FIG. 11; and

FIG. 16 is a sectional view taken along line XVI—XVI of FIG. 11.

Figure 1:
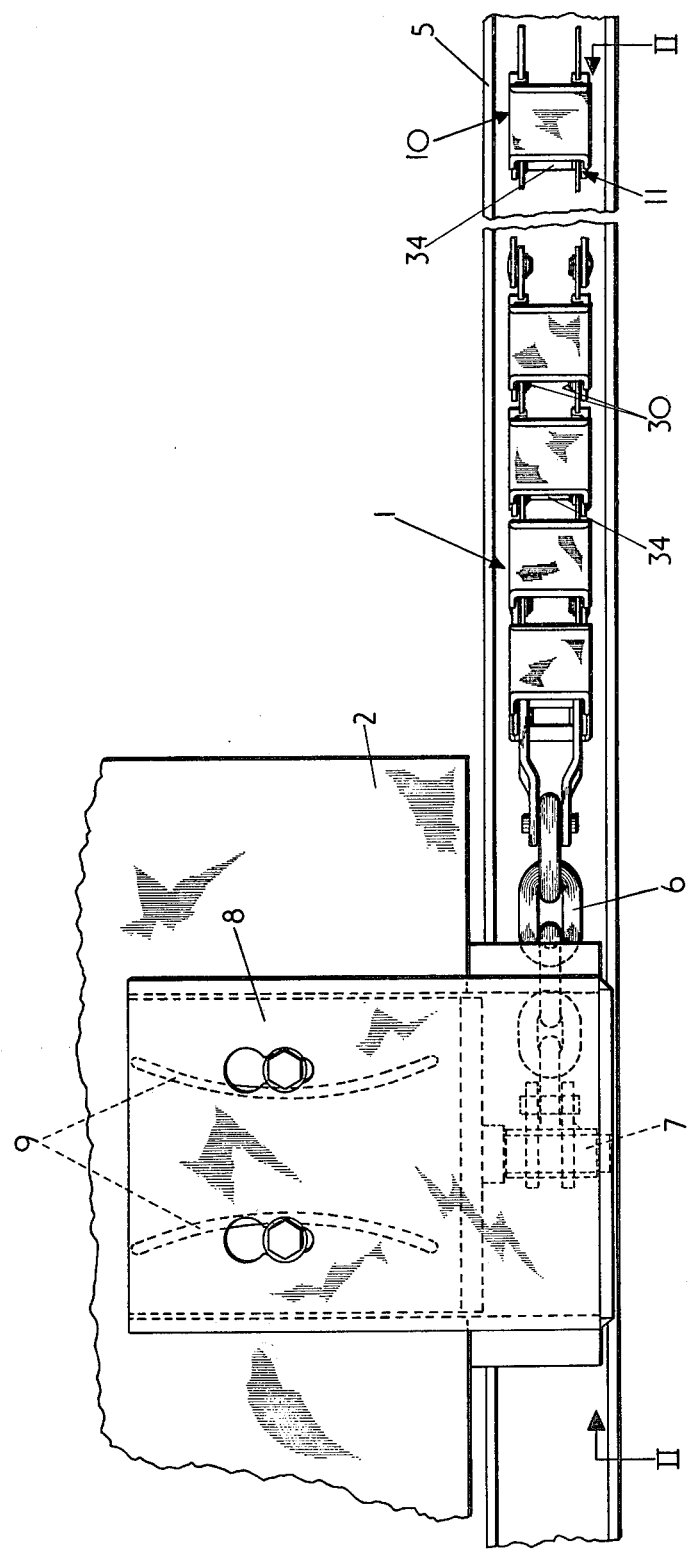
FIG. 1 is an incomplete plan of chain equipment for protecting elongate flexible supply components to a mineral mining machine, the chain equipment being constructed in accordance with the present invention.

In the drawings, the chain equipment 1 is shown extending along a longwall face to a mineral mining machine 2 (only a portion of which is shown) which, in operation, repeatedly traverses to and fro along the longwall face winning mineral from the working face. Typically, the longwall face is two hundred metres long, the chain extending from a point adjacent to the centre of the longwall face to the mining machine. Thus, as the machine repeatedly traverses to and fro the chain is first laid along one half of the longwall face as the machine traverses to one end and then looped over itself as the machine traverses in the opposite direction. By the time the machine reaches the opposite end of the longwall face the chain extends along the other half of the longwall face so that when the machine starts its traverse along the longwall face in the first mentioned direction the chain is looped over itself in the opposite direction to that previously mentioned. Thus, as the machine repeatedly traverses to and fro the chain is repeatedly extended towards one end of the longwall face and then looped over itself when the machine changes its direction of traverse.

Figure 2:
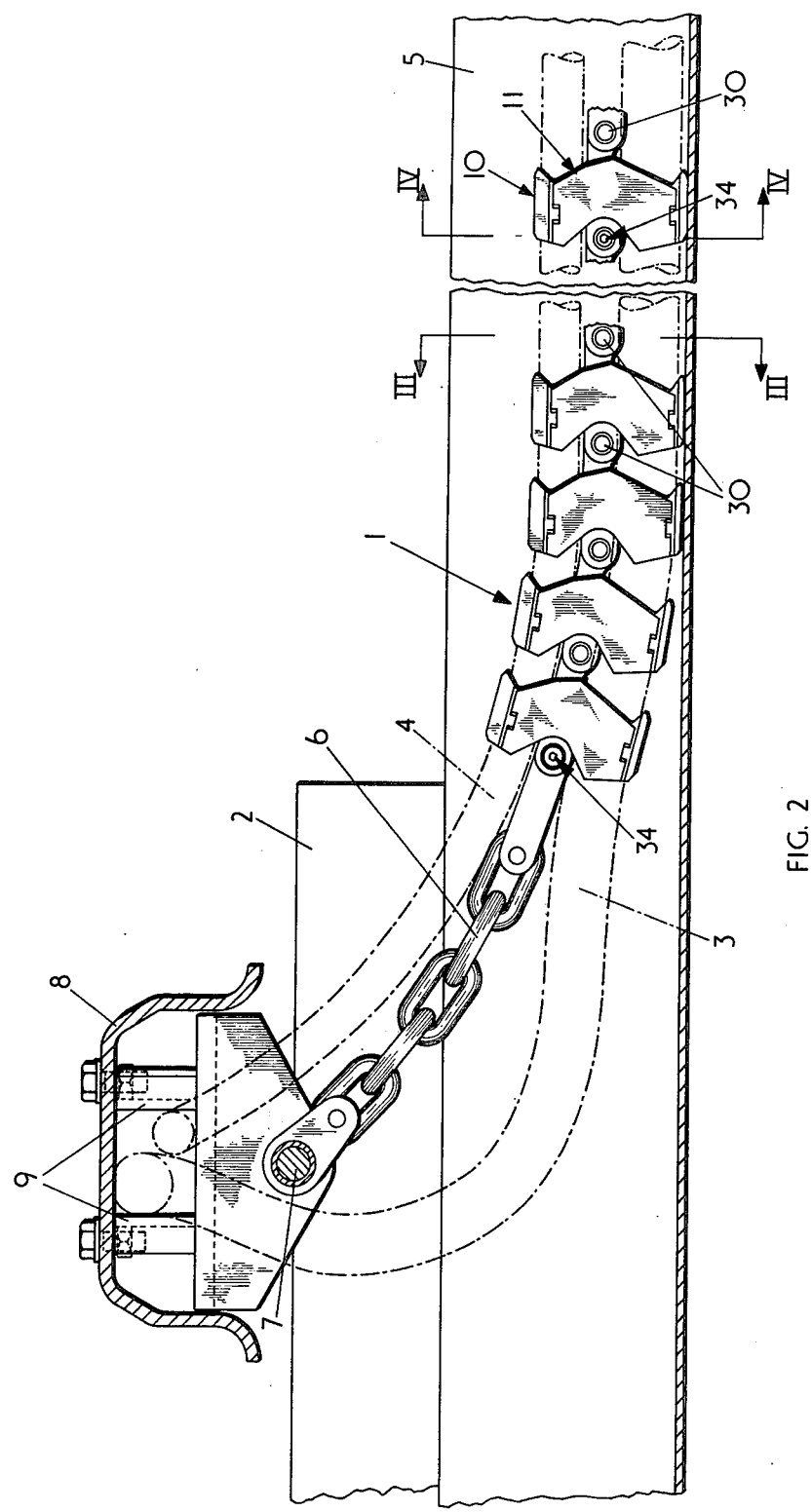
FIG. 2 is a sectional view taken along line II—II of FIG. 1.

The chain 1 provides protection for two elongate flexible supply components for the mining machine, the components being an electric cable 3 and a hydraulic hose 4 (indicated by broken line in FIG. 2 only). The supply components extending from control equipment (not shown) located adjacent to one end of the longwall face along a fixed guide trough 5 (only a portion of which is shown in FIGS. 1 and 2) to the previously mentioned point adjacent to the centre of the longwall face where the supply components enter the chain 1.

The portion of the chain 1 adjacent to the machine 2 is hauled along behind the machine by means of a short length of round link chain 6 secured between a bolt 7 fixedly attached to the machine and the chain. The portions of the supply components associated with the chain 6 are fed from the protecting chain 1 to a guide shield 8 provided on the machine and comprising curved guides 9 around which the components pass. It will be appreciated that as the supply components are hauled behind the machine they are protected and are supported by the chain 1 so that they remain intentioned, the hauling forces being carried by the chains 1 and 6.

The chain links will now be described in more detail reference to all the accompanying Figures.

Each link is adapted to be pivotally attached to its neighbouring links so that the chain 1 is flexible in the vertical plane and capable of being looped over itself to form overlaying runs. Each link comprises two releasably connected elements 10 and 11 which define a passageway 12 for the supply components 3 and 4. One element 10 provides two horizontal walls 13 and 14 and one side wall 15 of the passageway 12 so to effectively define an open-sided passageway. The other element 11 provides the other side wall defining a closure member for the passageway to retain the supply components 3 and 4 with the passageway 12. However, as will be explained later in this specification, the element 11 can be disconnected from the element 10 to permit access to the passageway for the removal or replacement of the supply components.

Figure 3:
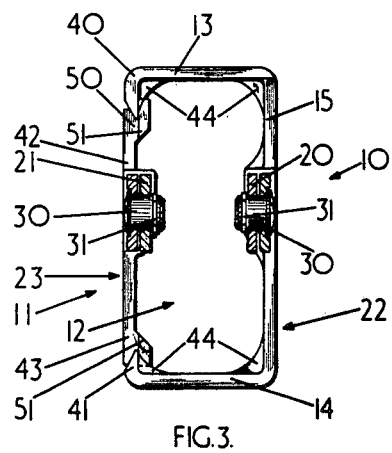
FIG. 3 is a sectional view taken along line III—III of FIG. 2.
Figure 4:
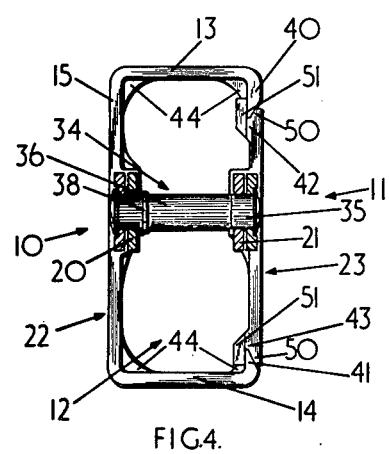
FIG. 4 is a sectional view taken along line IV—IV of FIG. 2.
Figure 5:
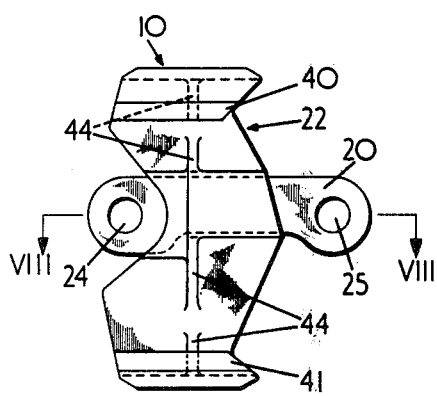
FIG. 5 is a side view of one element of a chain link of the chain equipment of FIGS. 1 to 4.
Figure 6:
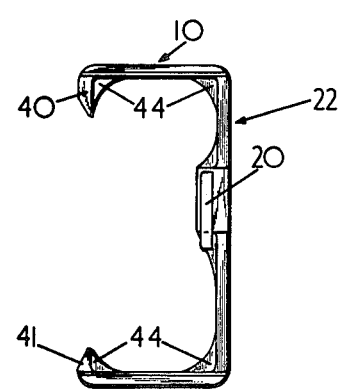
FIG. 6 is an end view of the element of FIG. 5.
Figure 7:
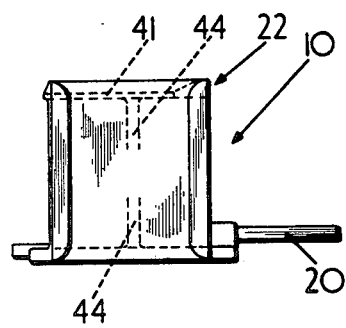
FIG. 7 is an inverted plan of the element of FIG. 5.
Figure 8:
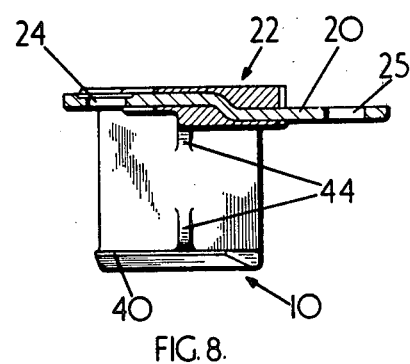
FIG. 8 is a sectional view taken along line VIII—VIII of FIG. 5.
Figure 9:
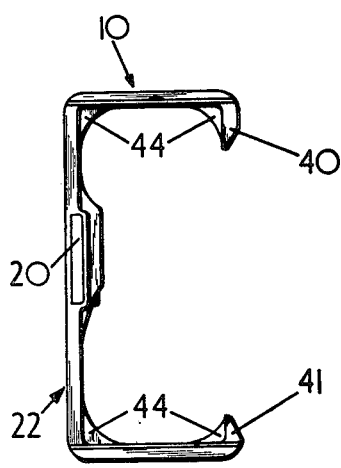
FIG. 9 is an end view of the element of FIG. 5, viewed from the opposite end to FIG. 6.
Figure 10:
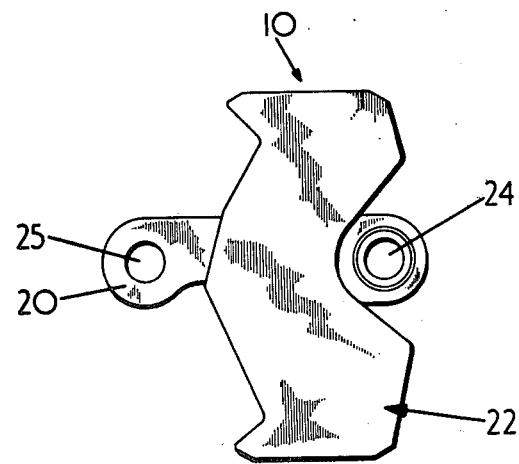
FIG. 10 is a side view of the element of FIG. 5, viewed from the opposite side to FIG. 5.

Each of the elements 10 and 11 comprises a cranked metal insert 20 and 21 and a cast wall member 22 and 23, respectively, the metal inserts having two cross bores 24, 25 and 26, 27 for pivotal attachment to bores 25, 24 and 27, 26 of the elements neighbouring links. Most of the pivotal attachments are by means of short pins 30 (see FIGS. 1, 2 and 3) which are retained in pivotal engagement with the bores by circlips 31. It will be seen that separate pins 30 are provided for attaching the elements 10 and 11, respectively. A preselected number of links are pivotally attached to one of their neighbouring links by locking pin assemblies 34 (see particularly FIGS. 1, 2 and 4) which extend across the passageway 12 to interconnect the two elements 10 and 11 of the associated links and thereby retain the two elements 10 and 11 in a desired relative position as will be described later in this specification. Each locking pin assembly 34 comprises a pin member 36 having an internally threaded bore (not shown) engageable by a threaded projection (not shown) on a member 35. A circlip 38 is provided to retain the pin member 36 engaged in the bores 24, 25.

The cast wall member 22 of each element 10 defines two vertically spaced tracks 40 and 41 of a slideway extending in the longitudinal direction of the chain. The track members constituting the tracks 40 and 41 are wedged shaped to slideably accommodate outwardly tapered fork members 42 and 43, respectively, provided on the vertically spaced end margins of each element 11. The arrangement is such that the disconnected element 11 can be slid along the slideway track 40, 41 until the element 11 effectively closes the passageway 12 defined by the element 10, movement of the element 11 along the slideway being limited by strengthening ribs 44 formed on the insides of the walls of the element 10.

The two horizontal walls 13 and 14 of the elements 10 constitute vertically spaced end margins which are slideable over the adjacent end margins of other links in a lower run of the chain when the chain is looped over when the machine changes its direction of traverse as previously described, the end margins having a longitudinal length greater than one half the distance between two bores 24 and 25, and 26 and 27 to ensure the links in the upper run cannot fall into the lower run and foul the links in the lower run. The leading edge of the end margin of each element 10 is tapered to permit the links of different runs to negotiate each other as the upper run slides over the lower run.

The side walls of the elements 10 and 11 as viewed from the side are cut away to accommodate the end margins of an adjacent link when the chain is looped over. The elements are cut away to permit an acceptable small loop radius to be achieved.

In use, the elements 10 of the chain is assembled in the trough 5 behind the machine 2 with the pins 30 and pin members 36 in position in the bores 24 and 25 pivotally attaching the elements together. Thus, the chain defines an open sided passageway into which the electric cable 3 and hydraulic hose 4 can be inserted. Next, a preselected number of closure member elements 11, say for example ten, are taken and pivotally attached by pins 30. The length of the pivotally connected closure member elements are then slid onto the tracks 40, 41 to close the passageway 12 associated with the respective elements 10. In FIGS. 11 to 15 it can be seen that the forked members 42 and 43 comprises two opposing limbs 50 and 51 engageable with the sides of the associated wedge shaped track member. The limb 50 comprises two sections spaced by a gap opposite a projection constituting the limb 51.

When the ten pivotally attached closure member elements 11 are in the desired position effective closing the otherwise open side of the passageway 12, the pin members 35 are engaged on the associated pin members 36 to retain the length of closure members elements in the desired position, the link spacing of the locking pin assemblies 34 being the same as the number of closure elements constituting the preselected length. Once the length of closure member elements are in position the next length or set of closure member elements is assembled on the chain. The procedure is repeated until the passageway is effectively closed along the whole length of the chain. It will be appreciated this location of the closure member elements is rapidly achieved. It also will be appreciated that the assembled chain has all its links pivotally attached to its neighbours by two separate pivotal attachments, i.e. one associated with the element 10 and one associated with the closure member elements. Consequently, the links tend not to twist.

From the above description it will be seen that the present invention provides a simple and robust chain for protecting and supporting supply components in hazardous conditions. Also, the closure member elements can be rapidly removed and replaced to permit relatively easy access to the passageway.

I claim:

1. A link adapted to be pivotally attached to similar adjacent links to provide a chain for protecting a plurality of flexible supply components leading to equipment which in use repeatedly traverses to and fro, the link comprising two elements in engagement with each other, one of said elements defining an open sided passageway for containing said plurality of flexible supply components which elements when connected define a closed passageway around any such flexible supply components, the open side forming a part of the closed passageway when said elements are connected, and which other of said elements can be at least partially disconnected to permit access to the passageway, both the elements having means capable of being pivotally attached to elements of adjacent links.

2. A link as claimed in claim 1, in which the other element defines a side closure member for the passageway.

3. A link as claimed in claim 2, in which one element defines a slideway extending in a direction along the passageway, the other element being engageable with and slideable along the slideway to close the otherwise open sided passageway.

4. A link as claimed in claim 3, in which the closure member is retained in the closed position when the link is pivotally attached to adjacent links.

5. A link as claimed in claim 4, in which the said one element has vertical end margins providing slide surfaces adapted, in use, to slideably engage and support vertical end margins on other links of the chain when the chain is looped back over itself as the equipment repeatedly traverses to and fro.

6. A chain for protecting a plurality of elongate flexible supply components leading to equipment which in use repeatedly traverses to and fro, each link of the chain comprising two elements in engagement with each other one of said elements defining an open sided passageway for containing said plurality of flexible supply components, which elements when connected define a closed passageway around any such plurality of flexible supply components, the open side forming part of the closed passageway when said elements are connected, and which other of said elements can be at least partially disconnected to permit access to the passageway, both elements having means for pivotally attaching to the elements of adjacent links.

7. A chain as claimed in claim 6, in which a plurality of attached closure members are simultaneously engageable with, and slideable along, the slideways of the respective said one elements.

8. A chain as claimed in claim 7, in which the elements are detachably pivotally attached to the elements of adjacent links by pins engageable in cross holes formed in the elements.

9. A chain as claimed in claim 8, in which the elements of preselected links are releasably pivotally attached by locking pins which extend across the passageway interconnecting the said one element with its associated closure members which thereby is retained in the closed position.

10. A chain as claimed in claim 9, in which the elements have cut-outs to accommodate the vertical end margins of adjacent links when the chain is looped over.

* * * * *